Patented Mar. 3, 1936

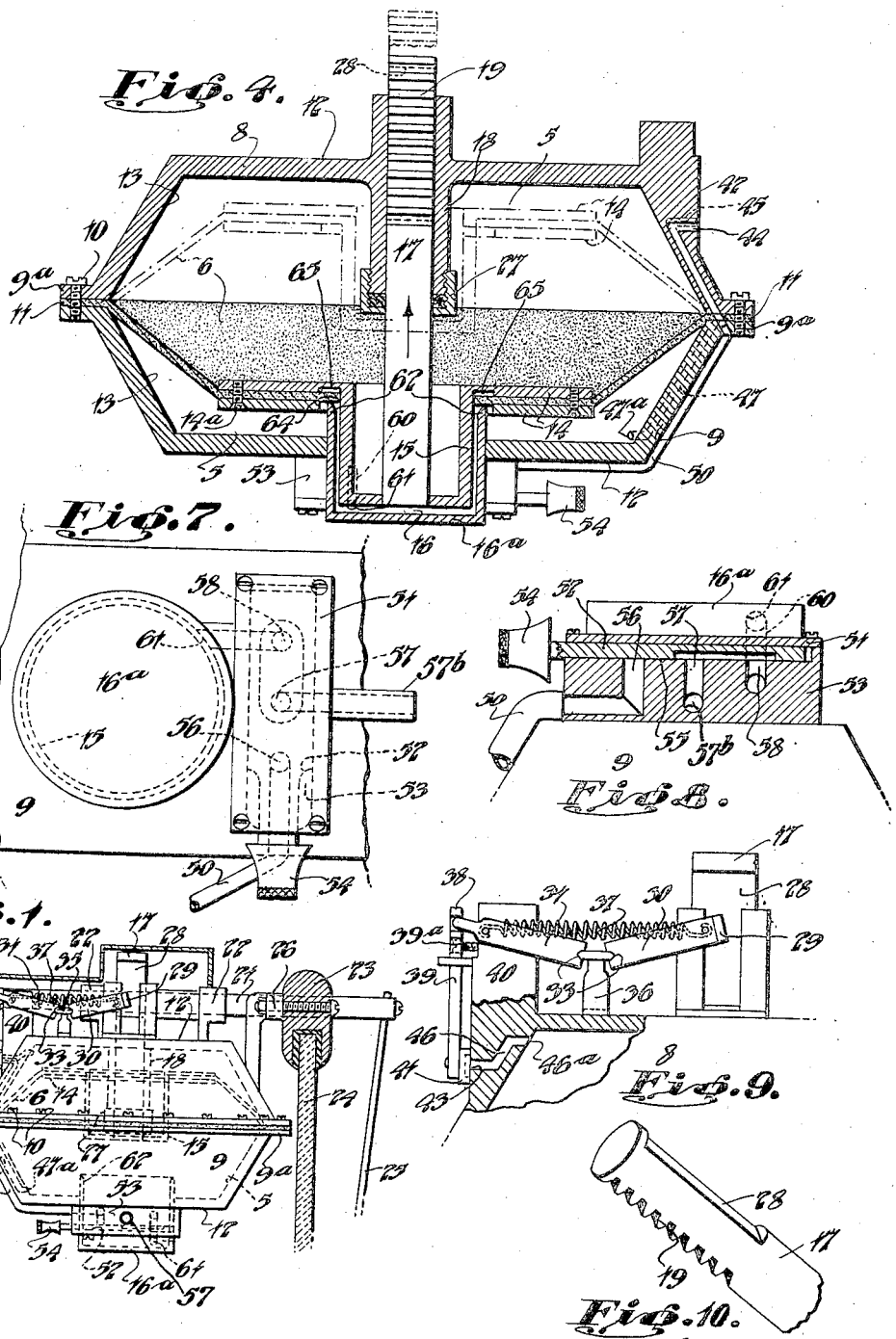

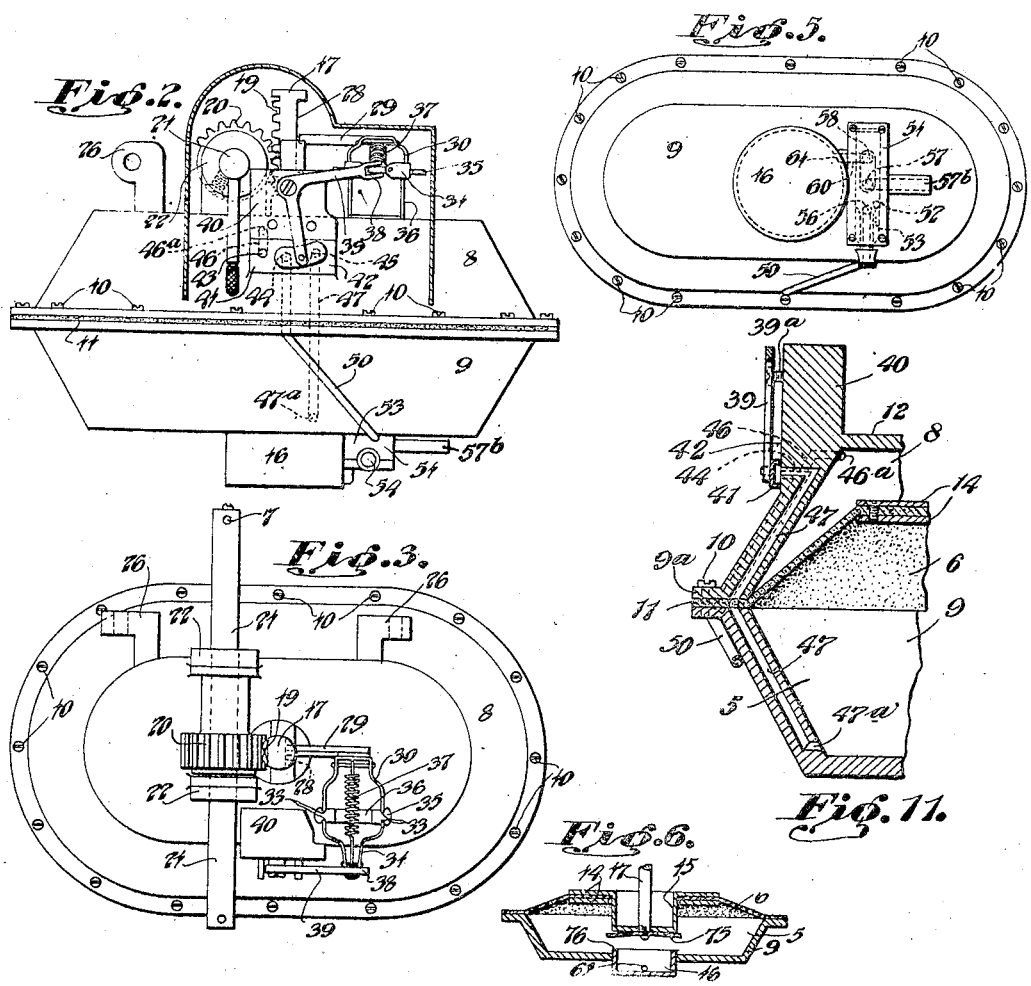

2,032,715

UNITED STATES PATENT OFFICE 2,032,715

WINDSHIELD WIPER MOTOR

Reginald Arthur Powell and Roy William Newton, Collingwood, near Melbourne, Victoria, Australia, assignors to Patent Holdings Proprietary Limited, Melbourne, Victoria, Australia Application August 20, 1932, Serial No. 629,704
In Australia July 19, 1932

3 Claims. (Cl. 121—48)

This invention has reference to an improved windshield wiper motor for automobiles and the like and has been devised to provide a windscreen wiper motor that will operate efficiently under all working conditions, the wiper being of the type wherein the movement obtained by the pulsations of a resilient and/or flexible diaphragm is converted into an arcuate reciprocating motion on the part of a wiper arm mounted in the usual manner on the surface of a windshield.

The object of our invention is to provide a highly durable and efficient windshield wiper motor comprising essentially a recessed vacuum chamber having disposed therein a flexible diaphragm, the chamber having exterior snapover valve mechanism associated therewith to co-act with the diaphragm spindle to subject each side thereof alternately to vacuum to create a pulsating movement to the said diaphragm while means are incorporated with the spindle of the said diaphragm to convert the reciprocating motion caused by the pulsations into a partial rotary reciprocating motion which is imparted to a wiper arm disposed in the usual position in relation to a windshield thereby effecting the arcuate reciprocation of the said arm to remove the moisture from the said screen or shield and means are included to manually control the operation of the wiper motor for starting and stopping purposes, and during the stopping operation return the wiper arm to a normal inoperative position clear of the vision of the driver.

Other objects and features of the improved wind screen wiper will be apparent from the foregoing description in relation to the attached drawings in which:—

Figure 1 is a view in side elevation of our improved windshield wiper in the assembled position.

Figure 2 is a front elevation of the wiper motor, and

Figure 3 is a plan thereof.

Figure 4 is a vertical central section of the wiper motor.

Figure 5 is an inverted plan of the wiper motor.

Figure 6 is a central section of a modified valve arrangement in the wiper motor.

Figs. 7 and 8 are details of the manually operable valve mechanism of the wiper motor;

Fig. 9 is a detailed view in front elevation, partly in section, of the snapover valve mechanism; while Fig. 10 is a perspective view of the diaphragm rod illustrating the rack and slot formed therein.

Fig. 11 is a fragmentary view, in section, of the motor, illustrating portions of the valve mechanism and fluid passages.

According to one form of carrying the invention into practical effect, the motor for the wiper consists, inter alia, of a recessed vacuum chamber 5 in which a diaphragm 6 is disposed as the actuating member of the wiper arm.

The diaphragm 6 is composed of any suitable flexible material and is shaped to correspond with the outline of the respective sections of the vacuum chamber which is formed of two correspondingly shaped and divided sections 8 and 9, the outer edges 9a of which are flattened and securely fastened together by means of spaced studs 10.

As illustrated in Figure 4, it will be noticed that the outer peripheral edges 11 of the diaphragm 6 are seated between the united sections 8 and 9 of the vacuum chamber 5 to form a gasket for same and thereby seal the interior of the vacuum chamber.

The vacuum chamber 5 may be shaped in the manner illustrated in the accompanying drawing while the upper and lower exterior surfaces 12 of the chamber are substantially flat to have mounted thereon the control mechanism and valves as will be hereinafter described.

Each divided and complemental section 8 and 9 of the vacuum chamber is correspondingly shaped and provided with an internally tapered wall 13 which actually defines and limits the movement of the diaphragm.

The diaphragm 6 is attached to plates 14, the upper of which is formed integral with an open cylinder 15 which depends into a restricted auxiliary casing 16 formed on the underside of the vacuum chamber 5 and opening into the lower complemental section 9, the plates 14 being attached to the diaphragm 6 by means of spaced screws 14a or the like.

The box of the depending cylinder 15 has attached thereto the lower end of a centrally disposed vertical rod 17 which extends upwardly through a guide bearing 18 formed in the upper section 8 of the vacuum chamber 5, while the upper end of the rod 17 is formed with a rack surface 19 of predetermined length to engage with an oscillating mutilated pinion 20 supported on a transverse spindle 21 carried in bearings 22 mounted on the upper flat surface 12 of the vacuum chamber.

The spindle 21 of the oscillating pinion 20 is extended through the frame 23 of the windshield 24 to receive the squeegee wiper arm 25 in the usual manner.

The upper surface 12 of the vacuum chamber 5 is attached to the spaced right angled lugs or brackets 26 which are adapted to be secured to the frame 23 of the windshield 24 to retain the motor of the wiper in an operative position as illustrated in Figure 1.

The lower end of the bearing surface 18 within the vacuum chamber is threaded to receive the screw cap and gland 27 which are disposed around the rod 17 to prevent leakage of air during the operation of the diaphragm 6 and its rod 17 as will be described.

The upper extremity of the diaphragm rod 17 is formed with a recess 28 which is of equal length and oppositely disposed in relation to the rack surface 19, the said recess 28 being substantially rectangular and of a depth to permit a projection to extend and seat therein.

The recess 28 is in constant engagement with a right angled projection or lug 29 formed on one end of pivoted and inclined spring controlled yokes 30 and 31, each yoke being united at one end and the said yokes 30 and 31 being adapted to pivot on a common centre line, being inclined towards each other with their inner ends formed with grooves 33 to engage with each side of the upper flattened portions 35 of a channel shaped bracket 36 mounted on the upper flat surface 12 of the vacuum chamber 5.

The grooves 33 formed in the inner ends of the yokes 30 and 31 are adapted to seat on each edge of the flattened portions of the bracket as illustrated in Figures 1 and 3, with the said yokes 30 and 31 inclined towards each other and united by a tension spring 37 disposed between said yokes to extend from an anchored position at the outer end of each yoke.

As previously described, the inner yoke 30 is provided with a right-angled extension or lug 29 which is in constant engagement with the recess 28 formed in the rod 17 of the diaphragm 6 while the other yoke 31 has its outer end reduced to seat in the bifurcated end 38 of a bell crank 39 which is pivoted as at 39a to an upraised portion or block 40 formed on the outer casing of the upper complemental section 8 of the vacuum chamber 5 while the other and lower end of the bell crank 39 is secured to a slide valve 41 of suitable dimensions which operates over a valve surface 42 formed on the outer surface of the vertical block 40, the valve surface 42 being provided with three spaced ports 43, 44 and 45, the centre port 44 comprising the vacuum supply port, while the ports 43 and 45 on each side thereof are provided with tubular leads 46 and 47, respectively, which extend to ports 46a and 47a in each divided member 8 and 9 forming the vacuum chamber.

The slide valve 41 is of such an area that it covers or selects two of the ports 43 and 44, or 44 and 45 at one time whereby vacuum is passed from the centre port to one of the side ports 43 or 45 to draw air from one side of the diaphragm 6 and as the slide valve 41 reciprocates in a manner to be hereinafter described, therefore air is drawn alternately from each side of the diaphragm 6.

The vacuum supply port 44 has a tubular lead 50 to a manually operated valve 51 disposed on the underside of the vacuum chamber 5; this valve 51 comprises a slide member or blade 52 which is seated in a block 53 formed on the underside of the vacuum chamber and the outer end of the blade or slide member 52 is formed with a knob 54 for manual operation.

The valve surface 55 within the block 53 is formed with three spaced ports 56, 57 and 58 (Fig. 5), the centre one 57 of which extends into a passage 57a leading to a pipe 57b which is connected to the main vacuum supply such as the intake manifold of the engine, while one port 56 communicates with a lead 50 extending to the vacuum supply port 44 formed in the valve surface 42 over which the slide valve 41 reciprocates as previously described.

The other port 58 of the manually operated valve has a lead 60 directly to a port 61 in the tubular casing 16 in the casing 16a which is integral with the lower side of the main vacuum chamber 5 to receive the hollow cylinder 15 to which the rod 17 of the diaphragm 6 is attached as previously described.

The upper surface of the casing 16a extends for a limited distance into the lower section 9 as illustrated in Figure 4 and at its upper periphery is formed with an internally tapered rim 62 upon which the diaphragm 6 is adapted to seat when the wiper is in an inoperative position.

The seating of the diaphragm 6 is achieved by means of the annular clearance of material 64 which is maintained on the diaphragm 6 around the walls of the hollow depending cylinder 15, the clearance 64 being left between the walls of the cylinder 15 and the adjacent edges of the underside plate 14 which secures the said diaphragm 6 to the upper integral plate or flange 14 of the cylinder 15 as illustrated more particularly in Figure 4.

The flange of the hollow cylinder 15 which comprises the upper diaphragm plate 14 is undercut as at 65 above the clearance 64 between the hollow cylinder 15 and the underside plates to facilitate the grip of the diaphragm on the rim 62 when same is in an inoperative position which occurs when air is drawn from the lower restricted chamber 16 which thereby draws the diaphragm 6 downwardly together with the hollow cylinder 15 which seats in the restricted chamber 16 and causes the material of the diaphragm in the clearance 64 to seat tightly on the rim 62.

The operation of the windshield wiper is as follows:—

The manually operated control valve 51 is set whereby its slide or blade 52 covers the main intake port 57 and the supply port 56 which leads to the valve surface 42 on the block disposed on the upper surface of the vacuum chamber whereby vacuum is delivered from the main supply such as the intake manifold past the manual control valve 51 and thence to the central port 44 of the slide valve 41 and according to which port (either 43 or 45) of the valve surface 42 is covered by the slide valve 41 in conjunction with the supply port 44, air is drawn through the tubular lead from the vacuum chamber 5 on either side of the diaphragm 6 which causes the said diaphragm to move alternately into the complemental sections 8 and 9 of the vacuum chamber 5.

This movement causes the corresponding movement on the part of the diaphragm rod 17 whereby the slot 28 in the diaphragm rod 17 engages with the right angled projection or lug 29 on the spring controlled yokes 30 and 31 and either tends to raise or lower same according to the inclination thereof and as the end of the recess 28 exerts pressure on the lug or extension 29 of the inner yoke 30, same is caused to pivot and during the initial movement of the pivot action the spring 37 is tensioned and energized whereby on the continued pressure of the end of the recess 28 on the lug 29, the spring causes a sudden snap over movement which pivots the yokes 30 and 31 inversely on their common centre, such pivot action imparting a simultaneous energized movement to the bell crank 39 which passes the slide valve 41 across to cover the other open vacuum supply port to thereby draw air from the other side of the vacuum chamber 5 which causes the diaphragm 6 to expand into the opposite recess 13 and commence a similar cycle of operations.

By drawing air alternately from each side of the vacuum chamber through the valve mechanism described, the diaphragm 6 is caused to move into each section 8 and 9 of the chamber 5 in turn, whereby a continuous pulsating movement is imparted to the diaphragm 6 and its rod 17.

As the rod 17 of the diaphragm 6 is reciprocating owing to the rack 19 imparting an oscillating rotary motion to the mutilated pinion 20 the spindle 21 of which has mounted thereon the squeegee wiper arm 25 and the oscillating rotation of the mutilated pinion 20 and its spindle causes the wiper arm 25 to reciprocate in an arcuate motion over the wind-screen or shield 24.

In this manner, by drawing air from each side of the diaphragm 6 it is caused to pulsate to effect a reciprocating motion to its rod 17 which is converted into a rotary oscillating motion by the rack 19 and pinion 20, while the spindle of the pinion imparts the arcuate reciprocating motion to the wiper arm 25 as previously described.

When it is desired to discontinue the operation of the wiper arm 25, the manually operable valve 51 is manipulated whereby the slide member 52 covers the main intake vacuum port 57 and the port 58 leading to the port 61 of the restricted vacuum chamber 16 whereby air is drawn from this latter chamber; the diaphragm 6 is immediately drawn downwardly and the hollow cylinder 15 enters the said chamber 16 to its maximum extent on continued suction being exerted the annular clearance 64 of the diaphragm around the upper surface of the hollow cylinder 15 is caused to impinge on the rim 62 formed on the upper periphery of the restricted vacuum chamber casing 16a.

As the diaphragm 6 seats on the rim 62 of the casing 16a same is sealed and the pressure therein causes the said diaphragm 6 to be held down in an inoperative position and as the diaphragm descends the wiper arm 25 is caused to ascend to an upper inoperative position and it is retained in this position by means of the inability of the diaphragm to pulsate.

In this manner when air is drawn from the restricted chamber 16 the diaphragm becomes inoperative while the wiper arm 25 through the medium of the gearing associated with the rod 17 of the diaphragm 6 is returned to its upper normal position where it is retained until required for further use.

In lieu of the valve arrangement for the diaphragm 6 when inoperative as illustrated in Figure 4 it has been found during experiments that satisfactory results may be obtained by a valve arrangement as illustrated in Figure 8 in which a floating valve 75 is attached to the underside of the diaphragm cylinder 15.

A windshield wiper constructed and arranged and operating in accordance with this invention is of great utility for the reason that there is no possibility of leakage occurring from the vacuum chamber 5 in which the flexible diaphragm 6 operates owing to the rod 17 of the diaphragm having only one entry into the said chamber 5, whereas wipers at present employed have two bearing surfaces and openings into the vacuum chamber wherein the leather actuator operates which, after continuous operation, causes the bearing surfaces to become worn and permit a natural leakage to occur with consequent loss of power in the motor of the wiper.

Furthermore, the gearing for the rod 17 of the diaphragm 6 in a wiper constructed in accordance with our invention is disposed outside of the vacuum chamber 5 and the wiper arm 25 itself is driven by the said gearing from the rod of the diaphragm whereby little or no thrust has to be taken by the diaphragm or its rod 17 but with wipers at present employed, the wiper arms are mounted on the spindles of the actuators causing a thrust on one side thereof in the vacuum chamber whereby loss of power is incurred in the wiper and the leather actuator becomes worn and ineffective in operation.

Although we have described and illustrated one embodiment of the invention, it will be obvious that any suitable working improvements and practical mechanisms may be incorporated with our improved wiper without departing from the ambit of the invention.

What we claim as our invention and desire to secure by Letters Patent is:—

1. In a wind shield wiper motor, a casing comprising two complemental sections, a diaphragm located in said casing, a rod attached to said diaphragm, means actuable by said rod to operate a wiper arm, snap-over valve mechanism mounted on said casing to be operated directly from said rod to withdraw air from each side of said diaphragm, an open cylinder attached to said diaphragm and the lower end of the diaphragm rod, a restricted casing formed in the lower complemental section of the casing in alignment with the open cylinder, said restricted casing having a port therein, a fluid passage connecting said port to communicate with a valve-controlled source of vacuum, a rim formed on the upper end of said restricted casing, and an annular clearance disposed around the open cylinder to permit the diaphragm material in said clearance to impinge on the rim when air is withdrawn from the restricted chamber.

2. In an improved wind shield wiper motor, a casing comprising two complemental sections, a flexible diaphragm located between the complemental sections of said casing, central plates attached to said diaphragm, an open cylinder formed integral with the upper plate, a rod attached to said cylinder, an annular clearance around said cylinder between the lower plate to provide an exposed annular section of diaphragm material, a restricted casing formed in the lower complemental section of the main casing in alignment with the cylinder, said restricted casing having a port therein, in communication with a valve surface connected to a source of vacuum, a manually operable valve associated with said valve surface, a valve seat in the upper periphery of the casing to receive the exposed annular section of the diaphragm when air is withdrawn from the restricted casing to prevent movement of the diaphragm and gearing included with the rod of said diaphragm to operate a wiper arm and to return the same to an upper inoperative position while said diaphragm is inactive.

3. In an improved wind shield wiper motor, a casing, a diaphragm, located in said casing and dividing it into two compartments, a rod attached to said diaphragm to operate a wiper arm, snap-over mechanism operated directly from said rod, a slide valve connected with said mechanism, a valve seat located below said valve, said valve seat having a series of ports therein, independent fluid passages emanating from said ports to communicate respectively with each side of the diaphragm, a valve seat formed on the underside of said casing and having a supply port therein, a manually operable slide member adjustable in relation to the last-mentioned valve seat, said valve seat having a series of other ports, independent fluid passages connected with said series ports and communicating respectively with the first-mentioned seat, a source of suction on one side only of the diaphragm, said slide member being adapted to cover two ports continuously to direct suction either to the slide valve or to one side only of the diaphragm for the purposes herein specified.

REGINALD ARTHUR POWELL.
ROY WILLIAM NEWTON.